US010210393B2

(12) United States Patent
Van Gorp et al.

(10) Patent No.: US 10,210,393 B2
(45) Date of Patent: Feb. 19, 2019

(54) VISUAL MONITORING SYSTEM FOR A LOAD CENTER

(71) Applicant: SCHNEIDER ELECTRIC USA, INC., Palatine, IL (US)

(72) Inventors: John C. Van Gorp, Sidney (CA); Matthew Stanlake, Victoria (CA); Mark A. Chidichimo, Victoria (CA)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 188 days.

(21) Appl. No.: 14/883,736

(22) Filed: Oct. 15, 2015

(65) Prior Publication Data

US 2017/0109589 A1  Apr. 20, 2017

(51) Int. Cl.

| | | |
|---|---|---|
| *G06K 9/00* | (2006.01) | |
| *H04N 5/232* | (2006.01) | |
| *H04N 5/265* | (2006.01) | |
| *H04N 5/33* | (2006.01) | |
| *H04N 7/18* | (2006.01) | |
| *H04N 5/247* | (2006.01) | |

(52) U.S. Cl.
CPC ..... *G06K 9/00771* (2013.01); *H04N 5/23238* (2013.01); *H04N 5/265* (2013.01); *H04N 5/33* (2013.01); *H04N 7/181* (2013.01); *H04N 5/247* (2013.01)

(58) Field of Classification Search
CPC ........... G06K 9/00771; H04N 5/23238; H04N 5/265; H04N 5/33; H04N 7/181
See application file for complete search history.

(56) References Cited

U.S. PATENT DOCUMENTS

| 9,635,282 | B2* | 4/2017 | McManus | ................. H04N 5/33 |
| 2002/0136435 | A1* | 9/2002 | Prokoski | ............ G06K 9/00221 |
| | | | | 382/118 |
| 2003/0169518 | A1 | 9/2003 | Irani | |
| 2006/0077255 | A1* | 4/2006 | Cheng | .................. G06K 9/0063 |
| | | | | 348/143 |

(Continued)

OTHER PUBLICATIONS

Durocher et al. Infrared Windows Applied In Switchgear Assemblies: Taking Another Look. Presented At The 2014 IEEE IAS Annual Meeting—Mining Industry Committee Vancouver, BC: © IEEE. [retrieved on Nov. 22, 2016]. Retrieved from the Internet: <URL: file:///C:/Users/dj01/Downloads/IEEE%202014%20Paper%20-%20Infrared%20Windows%20Applied%20in%20Switchgear%20Assemblies%20-%20Taking%20Another%20Look%20(1).pdf>. pp. 1-4.

(Continued)

*Primary Examiner* — Joseph Suh
(74) *Attorney, Agent, or Firm* — Lando & Anastasi, LLP (57) ABSTRACT

According to one aspect, embodiments herein provide a visual monitoring system for a load panel comprising a first camera having a field of view and configured to be mounted on a surface of the load panel at a first camera position such that a first electrical component of the load panel is in the field of view of the first camera and to generate image based information corresponding to the first electrical component, and a server in communication with the first camera and configured to receive the image based information corresponding to the first electrical component from the first camera and to provide the image based information from the first camera to a user via a user interface.

18 Claims, 4 Drawing Sheets

(56) References Cited

U.S. PATENT DOCUMENTS

| | | | |
|---|---|---|---|
| 2006/0174480 A1* | 8/2006 | Kawada | G06T 7/001 29/833 |
| 2009/0109021 A1 | 4/2009 | Paoletti et al. | |
| 2010/0044567 A1* | 2/2010 | Brandt | G01J 5/0096 250/334 |
| 2010/0172567 A1* | 7/2010 | Prokoski | A61B 5/0064 382/132 |
| 2011/0118896 A1 | 5/2011 | Holloway | |
| 2011/0162202 A1* | 7/2011 | Miyahara | H05K 13/0465 29/832 |
| 2012/0307862 A1* | 12/2012 | Crottereau | G01J 5/041 374/130 |
| 2013/0083823 A1* | 4/2013 | Harr | G01J 5/026 374/121 |
| 2013/0250102 A1* | 9/2013 | Scanlon | H04N 5/33 348/143 |
| 2013/0317377 A1* | 11/2013 | Gupta | A61B 5/04525 600/515 |
| 2014/0046192 A1* | 2/2014 | Mullin | H05K 13/00 600/474 |
| 2014/0132735 A1 | 5/2014 | Lee et al. | |
| 2014/0160250 A1* | 6/2014 | Pomerantz | H04N 5/23229 348/47 |
| 2015/0022667 A1 | 1/2015 | McManus et al. | |
| 2015/0078678 A1* | 3/2015 | Grandin | H04N 5/2258 382/284 |
| 2015/0229884 A1* | 8/2015 | Kupiec | G08B 21/18 348/143 |
| 2015/0319407 A1* | 11/2015 | Frankel | H04N 7/186 348/14.02 |
| 2016/0158986 A1* | 6/2016 | Ochiai | B29C 45/76 264/40.7 |
| 2016/0323519 A1* | 11/2016 | Boydens | A01D 43/087 |
| 2017/0033734 A1* | 2/2017 | Uebel | G01K 13/00 |
| 2017/0089763 A1* | 3/2017 | Freer | G01J 5/0096 |

OTHER PUBLICATIONS

Notification of Transmittal of the International Search Report and the Written Opinion of the International Searching Authority from corresponding PCT/US2016/056978 dated Feb. 9, 2017.

Brochure—Safely Make Infrared Inspections and Comply with NFPA 70E Requirements, "H.VIR Comet® Infrared Window H.VIS Electric EyeTM Viewing Window", Square D by Schneider Electric, Sep. 2010, 2 pgs.

* cited by examiner

VISUAL MONITORING SYSTEM FOR A LOAD CENTER

BACKGROUND OF INVENTION

Field of the Invention

At least one example in accordance with the present invention relates generally to the monitoring of a load center or panelboard.

Discussion of Related Art

A load center or panelboard is a component of an electrical supply system which divides an electrical power feed from a power line into different subsidiary circuit branches. Each subsidiary circuit branch may be connected to a different load. By dividing the electrical power feed from the power line into subsidiary circuit branches, the load center may allow a user to individually control and monitor the current, power and energy usage of each load.

SUMMARY

Aspects in accord with the present invention are directed to a visual monitoring system for a load panel comprising a first camera having a field of view and configured to be mounted on a surface of the load panel at a first camera position such that a first electrical component of the load panel is in the field of view of the first camera and to generate image based information corresponding to the first electrical component, and a server in communication with the first camera and configured to receive the image based information corresponding to the first electrical component from the first camera and to provide the image based information from the first camera to a user via a user interface.

According to one embodiment, the visual monitoring system further comprises a second camera having a field of view and configured to be mounted on a surface of the load panel at the first camera position such that the first electrical component of the load panel is in the field of view of the second camera and to generate image based information corresponding to the first electrical component in the field of view, wherein the server is further configured to receive the image based information corresponding to the first electrical component from the second camera and to provide the image based information from the second camera to the user via the user interface.

According to one embodiment, the first camera is a wide-angle lens camera and the second camera is a focused-area camera, and the server is further configured to combine the image based information from the wide-angle lens camera with the image based information from the focused-area camera to generate a composite image of the first electrical component including merged information from both the wide-angle lens camera and the focused-area camera and to provide the composite image to the user via the user interface. In another embodiment, the first camera is a visual light based camera and the second camera is an infrared light based camera; and the server is further configured to combine the image based information from the visual light based camera and the image based information from the infrared camera to generate a layered image of the first electrical component including both visual light based information from the visual light based camera and infrared light based information from the infrared based cameral and to provide the layered image to the user via the user interface. In one embodiment, the first camera is further configured to generate at least one of still-image based information corresponding to the first electrical component and video image based information corresponding to the first electrical component.

According to another embodiment, the visual monitoring system further comprises a second camera having a field of view and configured to be mounted on a surface of the load panel at a second camera position such that a second electrical component of the load panel is in the field of view of the second camera and to generate image based information corresponding to the second electrical component, wherein the server is further configured to receive the image based information corresponding to the second electrical component from the second camera and to provide the image based information from the second camera to the user via the user interface. In one embodiment, the server is further configured to combine the image based information from the first camera with the image based information from the second camera to generate a composite image of the first electrical component and the second electrical component and to provide the composite image to the user via the user interface.

According to one embodiment, the visual monitoring system further comprises a monitoring circuit coupled to the first electrical component and configured to monitor at least one parameter associated with the first electrical component and to generate parameter based information corresponding to the first electrical component, wherein the server is further in communication with the monitoring circuit and is further configured to receive the parameter based information corresponding to the first electrical component from the monitoring circuit and to identify an event of interest in the first electrical component based on at least one of the image based information corresponding to the first electrical component and the parameter information corresponding to the first electrical component.

According to another embodiment, the monitoring circuit is further configured to monitor at least one of an electrical and an environmental parameter associated with the first electrical component. In one embodiment, the server is further configured to model a relationship between the parameter based information and the image based information corresponding to the first electrical component, and identify the event of interest in response to the parameter based information received from the monitoring circuit deviating from the model by more than a predetermined threshold. In another embodiment, the server is further configured to transmit a notification to the user via the user interface in response to identifying the event of interest.

According to one embodiment, the server is further configured to analyze the image based information over a period of time and to identify an event of interest in the first electrical component based on a determination that the image based information has changed over the period of time. In another embodiment, the server is further configured to store at least a subset of the image based information in memory in response to identifying the event of interest.

Another aspect in accord with the present invention is directed to a method for monitoring a load panel comprising monitoring, with at least one first camera having a field of view and mounted on a surface of the load panel, a first electrical component of the load panel, transmitting, by the at least one first camera, image based information associated with the first electrical component from the at least one first camera to a server, and providing, with the server, the image based information to a user via a user interface.

According to one embodiment, the method further comprises monitoring, with at least one second camera having a field of view and mounted on a surface of the load panel, a second electrical component of the load panel, transmitting, with the at least one second camera, image based information associated with the second electrical component from the at least one second camera to a server, combining the image based information associated with the first electrical component with the image based information associated with the second electrical component to generate a composite image of the first and second electrical components, and providing the composite image to the user via the user interface.

According to another embodiment, the method further comprises monitoring at least one parameter associated with the first electrical component, modeling a relationship between the at least one parameter and the image based information associated with the first electrical component, identifying an event of interest in response to a determination that the image based information deviates from the model by at least a predetermined threshold, and notifying the user via the user interface in response to identifying the event of interest.

At least one aspect in accord with the present invention is directed to a load panel comprising at least one load section, at least one electrical component located within the at least one load section, a door configured to cover the at least one electrical component within the at least one load section when closed, and means for monitoring the at least one electrical component and for identifying an event of interest in the at least one electrical component inside the load section while the at least one electrical component is energized and the door is closed.

According to one embodiment, the means for monitoring the at least one electrical component includes means for capturing image based information corresponding to the at least one electrical component while the at least one electrical component is energized and the door is closed. In one embodiment, the means for monitoring the at least one electrical component includes means for monitoring at least one parameter of the at least one electrical component while the at least one electrical component is energized and the door is closed. In another embodiment, the means for identifying an event of interest includes means for correlating the image based information corresponding to the at least one electrical component with the at least one parameter of the at least one electrical component and for identifying the event of interest based on the correlation.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, a load center or panelboard is a component of an electrical supply system which divides an electrical power feed from a power line into different subsidiary circuit branches. Typically, each circuit branch is coupled to the power line via a circuit breaker. Each circuit breaker is configured to automatically open and prevent current in a circuit branch if an overload or short circuit is detected in the circuit branch. Conventional load centers or panelboards may also include other electrical components such as trip units, motor controls, switches, etc.

Standards and regulations designed to protect personnel from electrical equipment hazards (e.g., such as an arc flash) can make it difficult for an operator to monitor the health and status of electrical equipment within a load center or panelboard. For example, regulations may call for electrical switchgear (e.g., load centers or panelboards) to be de-energized and Personal Protective Equipment (PPE) worn before panels can be opened. In addition to the time and effort these practices involve, some diagnostic techniques (e.g., such as Infrared (IR) viewing of electrical panel components and terminal connections) cannot be employed if the equipment is powered down.

One solution for the early detection and prevention of electrical component failure inside a load center or panelboard includes the use of an IR viewing window in the load center or panelboard. Such an IR viewing window allows an operator to view electrical components inside the load center or panelboard while the components are energized and without opening up the load center. However, viewing windows offer a limited field of view inside the load center or panelboard and still require an operator to periodically visit the load center or panelboard to perform an inspection. These "spot checks" are often infrequent and may not allow for correlation with power quality events captured by a power monitoring system.

A system for the continuous monitoring of energized electrical components inside a load center or panelboard that does not require the removal of panel covers or the opening of panel doors is provided in at least some embodiments described herein. The system provides continuous visibility of the operation of electrical components within a panelboard or load center while the components are live and operational, without compromising safety. The system may also enable correlation between events detected visually and events detected by electrical and/or environmental monitoring equipment.

Figure 1:
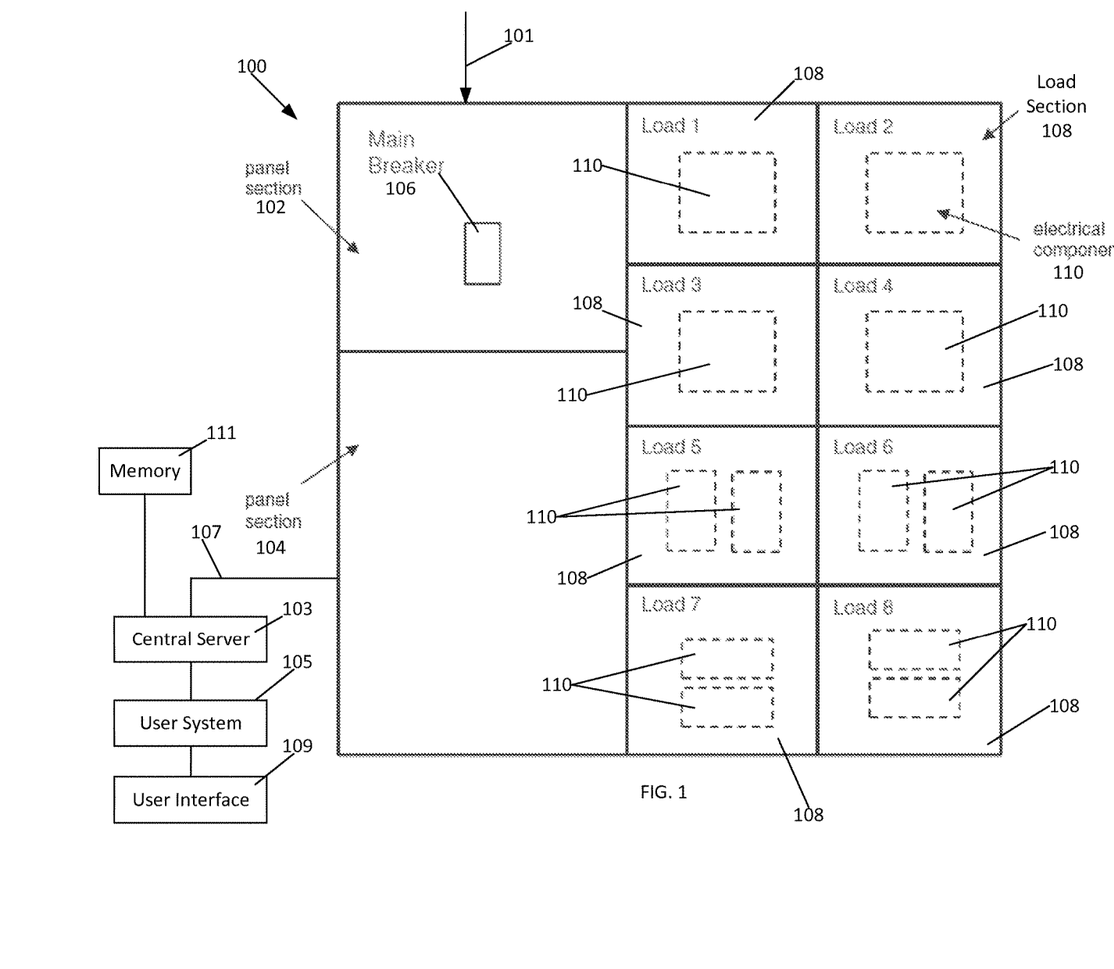
FIG. 1 is a block diagram of a load panel in accordance with aspects of the present invention.

FIG. 1 is a block diagram of a load panel 100 in accordance with aspects described herein. The load panel 100 is divided into different sections. The left side of the panel 100 contains an upper panel section 102 and a lower panel section 104. The upper panel section 102 includes a main breaker 106. The lower panel section 104 includes space for cabling and for future expansion. The right side of the panel 100 includes multiple load sections 108. Each load section 108 houses one or more electrical components 110 (e.g., a circuit breaker, trip unit, motor control, etc.). Each load section 108 is sealed with a panel cover or door (discussed in greater detail below) and according to some embodiments, may have cut-outs to expose switch controls, status indicators, and/or an analog/digital display. According to one embodiment, each load sections 108 cover or door may optionally include an IR viewing window, as discussed above, for thermal imaging of the electrical component 110 in the corresponding section 108 while the component 110 is energized. According to other embodiments, the load panel 100 may be configured in any other appropriate way.

Each electrical component 110 is coupled to the main breaker 106 and the main breaker 106 is coupled to an input line 101. The panelboard 100 receives input power from a power source via the input line 101 and the input power is provided to each load section 108 via the main breaker 106. If the main breaker 106 senses an overload or short circuit condition, the main breaker 106 opens, preventing current from the input line 101 to the load sections 108. Each load section 108 receives power from the main breaker 106 and provides power to a corresponding load coupled to the load section 108 via its electrical component(s) 110. According to some embodiments, if an electrical component 110 senses an overload or short circuit condition, the electrical component 110 opens, preventing current from the main breaker 106 to the load coupled to the corresponding load section 108.

Figure 2:
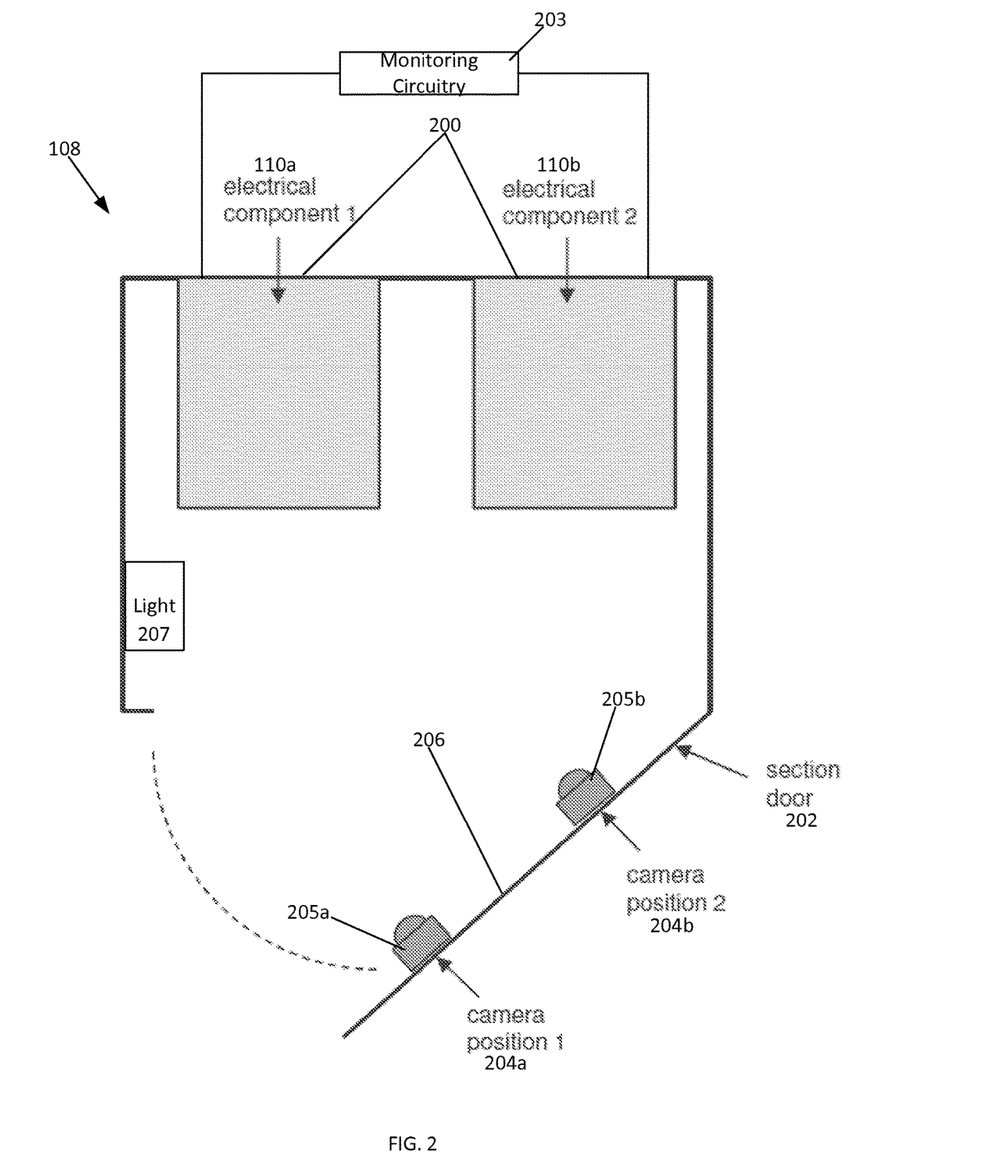
FIG. 2 is a top view of a load section in a load panel in accordance with aspects of the present invention.

FIG. 2 is a top view of a load section 108 according to at least one embodiment described herein. The load section 108 includes a first electrical component 110a and a second electrical component 110b located at a rear portion 200 of the load section 108. As described above, each electrical component 110a, 110b may be a circuit breaker, a trip unit, a motor control, etc. The load section 108 further includes a panel cover or door 202 that is configured to seal the load section 108 when closed. The door 202 includes a first camera position 204a and a second camera position 204b located on an inside surface 206 of the door 202. Each camera position 204a, 204b includes at least one camera 205a, 205b mounted to the door 202 such that it is positioned in front of a corresponding electrical component 110a, 110b when the door 202 is closed (i.e., the corresponding electrical component 110a, 110b is in the field of view of the camera 205a, 205b when the door 202 is closed).

For example, as shown in FIG. 2, when the door 202 is closed, the first camera 205a at the first camera position 204a is located in front of the first electrical component 110a and the second camera 205b at the second camera position 204b is located in front of the second electrical component 110b. As shown in FIG. 2, the load section 108 includes two camera positions 204a, 204b; however, in other embodiments, the load section 108 may include any number of camera positions. As also shown in FIG. 2, each camera position 204a, 204b includes a single camera 205a, 205b; however, in other embodiments, each camera position may include any number of cameras, each associated with any number of different electrical components. As also shown in FIG. 2, each camera position 204a, 204b (and its corresponding cameras) is associated with a single electrical component; however, in other embodiments, the cameras at a camera position may be configured to capture images and/or video from more than one electrical component. According to one embodiment, the cameras 205a, 205b are coupled to the door 202 with magnets or some other adhesive; however, in other embodiments, any other appropriate method for coupling the cameras 205a, 205b to the door 202 may be utilized. According to one embodiment, the cameras 205a, 205b are permanently attached to the door 202; however, in other embodiments the cameras 205a, 205b are capable of being removed from the door 202. In some embodiments, the cameras 205a, 205b are capable of being affixed to multiple different locations on the inside surface 206 of the door 202.

According to one embodiment, a camera position 204a, 204b may include multiple cameras, each having different capabilities to capture video and/or still images at different resolutions and light wavelengths. For example, in one embodiment, a camera position 204a, 204b includes both a visible light digital camera an infrared digital camera. The different cameras may be positioned to capture image based information (e.g., video and/or still images) of the same area of an electrical component or of different areas of the electrical component. For example, where the cameras are positioned to capture information of different areas of the electrical component, the visible light camera may be positioned to capture the motion of moving parts on the electrical component while the infrared camera may be positioned to capture the thermal profile of electrical connections to the electrical component.

In another embodiment, a camera position 204a, 204b may include one visible light camera with a wide-angle lens (to capture a wide area inside the load section 108) and another visible light camera focused on an area of interest on an electrical component and configured to provide undistorted images at a higher resolution. In other embodiments, each camera position may include any number and/or type of cameras, positioned in any number of different ways.

According to at least some embodiments, the load section 108 may also include monitoring circuitry 203. The monitoring circuitry 203 may be located anywhere in the load section 108 and may be coupled to any portion of the load section 108 and/or electrical component(s) 110a, 110b in the load section 108. The monitoring circuitry 203 is configured to monitor at least one environmental and/or electrical parameter of the load center and/or electrical component(s) 110a, 110b. For example, in one embodiment, the monitoring circuitry 203 is configured to monitor power being provided, via the electrical components 110a, 110b, to a load coupled to the load section 108. In another embodiment, the monitoring circuitry 203 is configured to monitor current through one or more electrical components 110a, 110b in the load section 108. In another embodiment, the monitoring circuitry 203 is configured to monitor voltage across one or more electrical components 110a, 110b in the load section 108.

In another embodiment, the monitoring circuitry 203 is configured to monitor ambient temperature in the load section 108. In another embodiment, the monitoring circuitry 203 is configured to monitor the temperature of one or more electrical components 110a, 110b in the load section 108. In another embodiment, the monitoring circuitry 203 is configured to monitor vibration of the load section 108. In other embodiments, the monitoring circuitry 203 may be configured to monitor any other type of environmental or electrical parameter associated with the load section 108.

The monitoring circuitry 203 and each camera 205a, 205b in the load section 108 are in communication with a central server 103 (shown in FIG. 1). The central server 103 is configured to communicate with the monitoring circuitry and the cameras within each load section 108 of the load panel 100. In one embodiment, the central server 103 is also configured to communicate with load sections 108 across multiple different load panels 100. In one embodiment, the central server 103 is located in a load panel 100; however, in other embodiments, the central server 103 is located external the load panel 100. In one embodiment, the central server 103 communicates with the monitoring circuitry 203 and the cameras 205a, 205b in each load section 108 via a network 107. In one embodiment, the network 107 is a Local Area Network (LAN); however, in other embodiments the network 107 is a Wide Area Network (WAN) (e.g., the Internet). In another embodiment, the network 107 is a wireless network.

The monitoring circuitry 203 transmits information associated with its monitored parameter(s) (e.g., voltage, current, power, temperature, vibrations, etc.) to the central server 103. Each camera 205a, 205b transmits its image based information (e.g., still image or video based information) to the central server 103. The central server 103 analyzes and processes the information received from the monitoring circuitry 203 and/or the cameras 205a, 205b and provides corresponding information to a system 105 operated by a user. The information provided to the system 105 may be displayed to the user via a user interface 109 (e.g., via a Graphical User Interface (GUI) displayed on the user interface 109).

In one embodiment, the central server 103 performs image processing on the image and/or video information received from the cameras in a load section 108 to generate corresponding information which is more useful for a user. For example, in one embodiment, images/video from multiple cameras within a load section are combined to form one composite image or video of one or more components within the section 108. In one embodiment, images/video from cameras at multiple camera positions can be combined to generate one comprehensive image or video. In another embodiment, where a camera position includes two different types of cameras (e.g., a visible light camera and an infrared camera) positioned in front of the same electrical component, the central server 103 is configured to combine the images and/or video from the two cameras into different display layers, allowing a user of the user interface 109 to switch between different views (e.g., visible and infrared views) of the electrical component.

In another embodiment, where a camera position includes a wide-angle lens camera, the central server 103 is configured to implement at least one of a variety of known techniques for the digital correction of images and/or video captured by the wide-angle lens. In another embodiment, where a camera position includes a wide-angle lens camera and a focused-area camera, the central server 103 is configured to merge the corrected image/video information from the wide-angle lens camera with the image/video information from the focused-area camera, generating a seamless final composite image or video which is displayed to the user via the user interface 109. In other embodiments, any other appropriate method or type of image processing may be utilized with the received images/video.

According to one embodiment, the central server 103 implements one or more algorithms on the captured image/video data from a load section 108 to create a pseudo-3D model of the components within the load section, allowing users to view synthetic perspectives of the load section 108 and its components. According to one embodiment, Image-Based Modeling and Rendering (IBMR) is applied to the captured image/video data by the central server 103 to create a model and render user views.

According to at least one embodiment, the central server 103 is configured to receive the image/video information and the electrical/environmental parameter information and process the information to detect potential events of interest. In one embodiment, the received information and/or a subset of the received information is stored in memory 111 to assist a user in a review of the potential events of interest. For example, in one embodiment, the central server 103 receives images/video from one or more cameras associated with an electrical component and compares successive images to look for changes in a corresponding electrical component. For instance, infrared images captured over time may show an increase in temperature at an electrical component terminal connection as the connection loosens over time. If a change in an electrical component is identified, the central server 103 may notify the user via the user interface 109.

According to another embodiment, the central server 103 only stores images and/or video when motion is detected. For example, in one embodiment where the central server 103 receives a video stream from one or more cameras associated with an electrical component, the central server 103 analyzes the video for changes (i.e, indications of motion) between frames of the video. If the central server 102 identifies an indication of motion in the video, the central server 102 stores clips of the video containing the detected motion in memory 111 for later review by the user.

As discussed above, the central server 103 associates received camera images and/or video information with specific electrical components within the load section 108 and analyzes the received information to identify potential events of interest. In other embodiments, the central server 103 may also associate the received camera information with the information received from the monitoring circuitry 203. In one embodiment, the central server 103 associates information received from at least one camera with electrical parameter information (e.g., voltage, current, power) received from the monitoring circuitry 203.

For example, in one embodiment, the central server 103 models the relationship between at least one image/video attribute (e.g., brightness, color, contrast) with at least one electrical measurement (e.g., current, voltage, power) associated with an electrical component. Once the model is created, the central server 103 sends a notification to the user, via the user interface 109, if the central server 103 receives data from the monitoring circuitry 203 that significantly deviates (e.g., by a predetermined threshold) from the model. For instance, if the central server 103 receives data from a current monitor associated with a circuit breaker and an infrared camera positioned in front of the circuit breaker, the brightness of images taken of the circuit breaker will increase as the current through the breaker increases. The central server 103 creates a model that describes this relationship between brightness and current. If later images shown an increase in brightness larger than expected for a given current, the central server 103 identifies a potential problem with the breaker and sends a notification to the user, via the user interface 109, indicating as such. According to other embodiments, the central server 103 may model any other appropriate type of image attribute with any other appropriate electrical parameter.

According to other embodiments, the central server 103 may also model image attributes against non-electrical measurements. For example, in one embodiment, the central server 103 receives environmental measurement data (e.g., corresponding to temperature, vibration, humidity, etc.) from the monitoring circuitry 203 and correlates the environmental measurement data against image brightness related to an electrical component in the load section 108. After creating a baseline model of the relationship between the environmental data and the image brightness, the central server 103 sends a notification to the user, via the user interface 109, if there is a sustained increase in brightness relative to that predicted by the model given the environmental data.

According to one embodiment, the central server 103 may also model the relationship between changes in a series of video frames/still images coincident with changes in a series of electrical/environmental measurements.

According to another embodiment, the central server 103 makes a variety of image manipulation capabilities available to a user via the user interface 109. For example, in one embodiment, the central server 103 displays, via the user interface 109, a timeline view of the image and/or video information received from the cameras in the load section 108. The timeline view displays the received image and/or video information in chronological order so that a user can review the image and/or video information associated with an electrical component at different points in time. In another embodiment, the central server 103 allows a user to operate the user interface 109 to zoom into and pan around images and/or video associated with an electrical component. According to another embodiment, the central server 103 allows a user to operate the user interface 109 to search for specific events shown in the received images and/or video by using search terms such as point in time, date range, or a range of measurement values (electrical and/or environmental) and view the image/video information corresponding to the specific events. According to another embodiment, the central server 103 allows a user to operate the user interface 109 to switch between different image layers (such as visible and infrared light).

According to another embodiment, the central server 103 may process the received images/video information to generate, and provide to the user via the user interface 109, an "x-ray" view of a specific load section 108. The x-ray view mimics what a user would experience if they had "x-ray" vision and could see through the door 202 of the load section 108 while standing in front of the panel 100. The central server 103 generates the x-ray view by combining a static image of the front of the load section 108 (e.g., of the door 202) with dynamic video/images captured within the load section 108 by the cameras 205a, 205b and replacing the door 202 with the dynamic video/image. According to one embodiment, the "x-ray" view includes multiple load sections 108.

According to one embodiment, the x-ray view includes a "ghosted" image of at least one section door 202. The "ghosted" image includes a transparent image of the at least one section door 202 located on top of dynamic video/images of a corresponding load section 108, which may help to orient the user by showing elements that appear on the door 202 (e.g., such as labels and/or switches) along with the dynamic video/images of the corresponding load section 108. According to one embodiment, the "ghosted" image can be enhanced by animating the elements shown on the "ghosted" section door 202 to show their current status (e.g., such as the position of breaker switches, the status of indicator lights, the current values on digital displays, etc.).

According to at least one embodiment, the load section 108 also includes a light source 207 located anywhere within the load section 108 to improve the quality of images and/or video captured by visible light cameras in the load section 108 when the door 202 is closed. According to one embodiment, the light source 207 is always on; however, in other embodiments, the light source 207 is controlled by the central server 102 such that it is turned on when the central server 103 is actively processing image/video data and/or when the door 202 is closed. According to one embodiment, the light source 207 has different levels of illumination and the central server 103 controls the output of the light source 207 depending on the image/video capture task at hand. For example, the central server 103 may operate the light source 207 to output a lower brightness level during background video capture and processing but briefly increase the brightness when a high-resolution image is captured.

Figure 3:
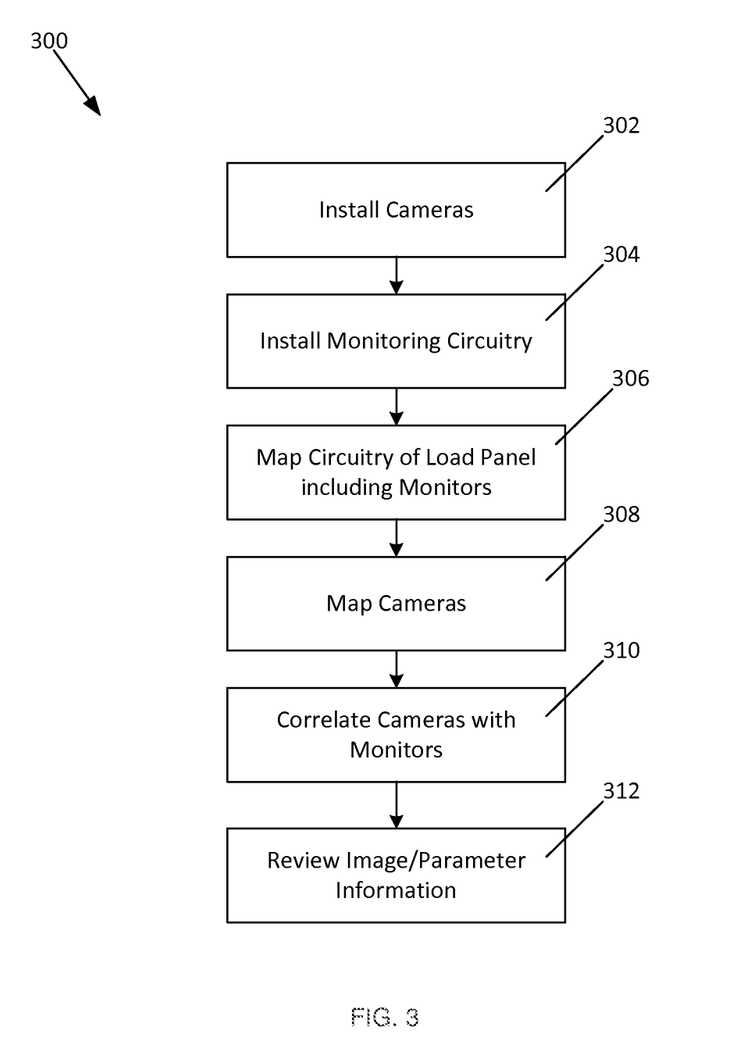
FIG. 3 is a flow chart of a process for installing cameras/monitoring circuitry in a load panel in accordance with aspects of the present invention.

According to one embodiment, the cameras 205a, 205b, and/or monitoring circuitry 203 are provided in a kit and are configured to be installed in a load section 108 by a user. For example, FIG. 3 is a flow chart 300 of a process for installing the cameras/monitoring circuitry in a load section 108. At block 302, the user installs the cameras 205a, 205b on the inside surface 206 of the door 202 such that each camera is positioned in front of a corresponding electrical component 110a, 110b when the door 202 is closed (i.e., the corresponding electrical component 110a, 110b is in the field of view of the camera 205a, 205b when the door 202 is closed). As described above, the cameras 205a, 205b can be attached to the door 202 with magnets, an adhesive, or another appropriate method for coupling the cameras 205a, 205b to the door 202 may be utilized. At block 302, the cameras 205a, 205b are also coupled to the central server 103 (e.g., via the network 107).

At block 304, the user installs monitoring circuitry in the load section 108 and/or load panel 100. The monitoring circuitry 203 may be located anywhere in the load section 108 or load panel 100 and may be coupled to any portion of the load section 108, load panel 100, and/or electrical component(s) 110a, 110b in the load section 108/load panel 100. As described above, the monitoring circuitry 203 is configured to monitor at least one environmental and/or electrical parameter of the load section 108, load panel 100, and/or electrical component(s) 110a, 110b. At block 304, the monitoring circuitry 203 is also coupled to the central server 103 (e.g., via the network 107). In one embodiment, the monitoring circuitry may already be installed in the load section 108/load panel 100 and be configured to monitor an electrical or environmental parameter of the load section 108/load panel 100. In such an embodiment, block 304 may be unnecessary.

At block 306, the user utilizes the user interface 109 (e.g., a GUI displayed on the user interface 109) of the system 105 to provide information to the central server 103 about the circuitry of the load panel 100. For example, at block 306, the user provides a mapping of the circuitry within the load panel 100 to the central server 103. The circuitry mapping may include an identification of the different components in, and coupled to, the load panel 100 (e.g., the electrical components 110 in each load section 108, the main breaker 106 and input line 101, the loads coupled to each load section, and/or the monitoring circuits 203 in the load panel 100) and information about how the different components are electrically connected. In other embodiments, the circuitry mapping may include other appropriate information corresponding to the components included in, and/or coupled to, the load panel 100. For example, in one embodiment, the circuitry mapping includes information about the load coupled to each load section 108. The load information may include information regarding the power drawn by each load in different states (e.g., on/off). This information can be utilized by the central server 103 when identifying potential events of interest to identify whether a condition change in an electrical component is due to a normal change in the load or due to a potential fault.

At block 308, the user utilizes the user interface 109 of the system 105 to provide information to the central server 103 about the cameras installed in the load panel 100. For example, at block 308, the user provides a mapping of the cameras installed within the load panel 100 to the central server 103. The camera mapping includes an identification of the different cameras installed in the load panel. In other embodiments, the camera mapping may include other information associated with the installed cameras.

At block 310, the user utilizes the user interface 109 of the system 105 to identify a correlation between each installed camera and at least one electrical component 110 (i.e., the electrical components in the field of view of each camera). By correlating each installed camera with at least one electrical component 110, the central server 103 can correlate electrical/environmental information received from monitoring circuitry 203 associated with an electrical component 110 with image based information received from camera(s) associated with the electrical component 110. As described above, by correlating electrical/environmental information and image based information, the central server 103 can identify potential events of interest in the electrical component(s) in the load panel 100.

At block 312, the image based information received from the cameras, the electrical/environmental information from the monitoring circuitry, processed imagery, and/or information regarding identified events of interest can be provided from the central server 103 to a user via the user interface 109, as described above.

Figure 4:
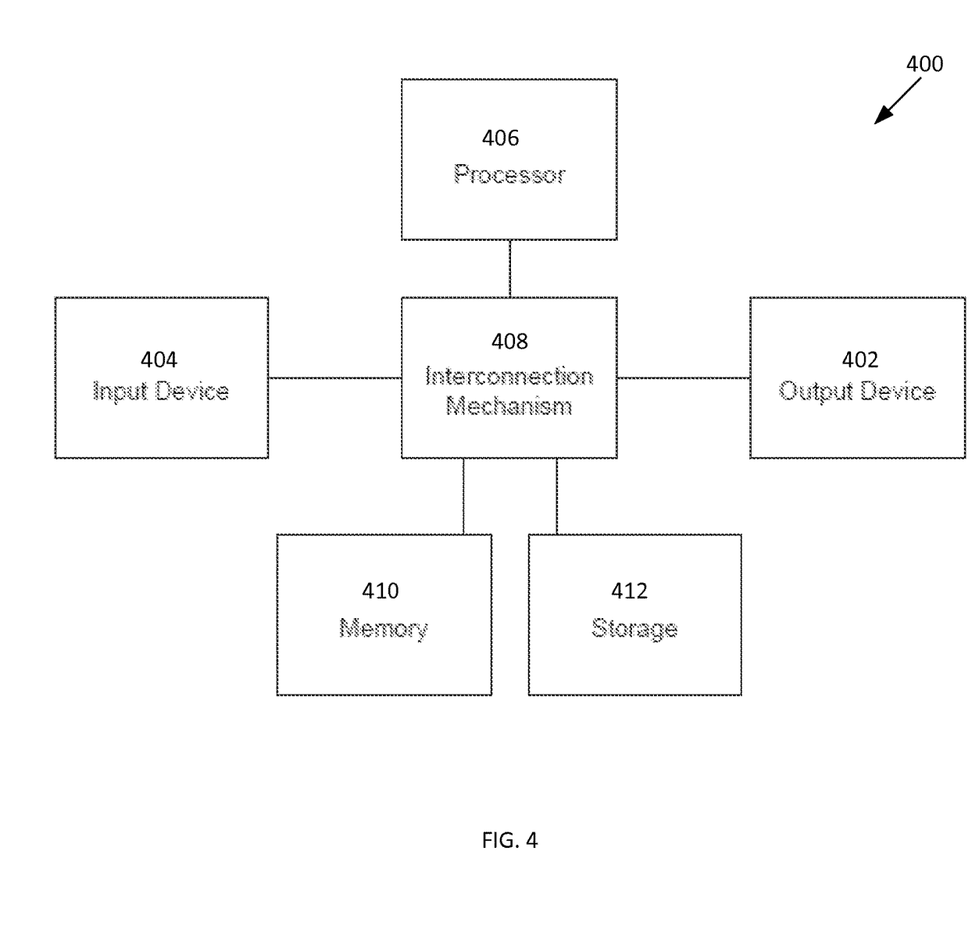
FIG. 4 is a block diagram of a system upon which various embodiments of the invention may be implemented.

FIG. 4 illustrates an example block diagram of computing components forming a system 400 which may be configured to implement one or more aspects disclosed herein. For example, the system 400 may be communicatively coupled to a controller, included within a controller, coupled to the server 103, or included within the server 103. The system 400 may also be configured to capture, process, and provide to a user, image/parameter information as discussed above.

The system 400 may include for example a computing platform such as those based on Intel PENTIUM-type processor, Motorola PowerPC, Sun UltraSPARC, Texas Instruments-DSP, Hewlett-Packard PA-RISC processors, or any other type of processor. System 400 may include specially-programmed, special-purpose hardware, for example, an application-specific integrated circuit (ASIC). Various aspects of the present disclosure may be implemented as specialized software executing on the system 400 such as that shown in FIG. 4.

The system 400 may include a processor/ASIC 406 connected to one or more memory devices 410, such as a disk drive, memory, flash memory or other device for storing data. Memory 410 may be used for storing programs and data during operation of the system 400. Components of the computer system 400 may be coupled by an interconnection mechanism 408, which may include one or more buses (e.g., between components that are integrated within a same machine) and/or a network (e.g., between components that reside on separate machines). The interconnection mechanism 408 enables communications (e.g., data, instructions) to be exchanged between components of the system 400. The system 400 also includes one or more input devices 404, which may include for example, a keyboard or a touch screen. The system 400 includes one or more output devices 402, which may include for example a display. In addition, the computer system 400 may contain one or more interfaces (not shown) that may connect the computer system 400 to a communication network, in addition or as an alternative to the interconnection mechanism 408.

The system 400 may include a storage system 412, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 410 that allows for faster access to the information by the processor/ASIC than does the medium. This memory 410 may be a volatile, random access memory such as a dynamic random access memory (DRAM) or static memory (SRAM). It may be located in storage system 412 or in memory system 410. The processor 406 may manipulate the data within the integrated circuit memory 410 and then copy the data to the storage 412 after processing is completed. A variety of mechanisms are known for managing data movement between storage 412 and the integrated circuit memory element 410, and the disclosure is not limited thereto. The disclosure is not limited to a particular memory system 410 or a storage system 412.

The system 400 may include a computer platform that is programmable using a high-level computer programming language. The system 400 may be also implemented using specially programmed, special purpose hardware, e.g. an ASIC. The system 400 may include a processor 406, which may be a commercially available processor such as the well-known Pentium class processor available from the Intel Corporation. Many other processors are available. The processor 406 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

As described above, cameras are located within an electrical panel to monitor components within the panel; however, in other embodiments, the same approach could also be applied to monitoring electrical equipment located throughout a facility. For example, cameras could be positioned to monitor a motor or transformer, and the resulting images/video could be processed as described above (either with or without associated electrical/environmental measurement data).

As described above, cameras are located on an in inside surface of a door of a load section; however, in other embodiments, cameras may be located at some other location within a load section. As also described above, each load section in a load center included cameras; however, in other embodiments, a limited number of load sections in a load center may include cameras.

As also described above, the monitoring circuitry 203 is located within a load section; however, in other embodiments, the monitoring circuitry 203 may be located anywhere in the load panel 100, may be coupled to any portion of the load panel 100, and may be configured to monitor any parameter (electrical and/or environmental) associated with the load panel 100. For example, in one embodiment, the monitoring circuitry is configured to monitor power, current, and/or voltage associated with the main breaker 106.

As described above, the central server receives information from a monitoring circuitry of a load section and from cameras located within a load section. In other embodiments, the central server may receive information from any number of monitoring circuits within a load panel and from any number of cameras within a load panel.

As described herein, a system for the continuous monitoring of energized electrical components inside a load center or panelboard that does not require the removal of panel covers or the opening of panel doors is provided. The system provides continuous visibility of the operation of electrical components within a panelboard or load center while the components are live and operational, without compromising safety. The system may also process captured video/image information to generate corresponding video/image information that is helpful to user monitoring the condition of electrical components within the panelboard and provide the corresponding information to a user via a user interface. The system may also enable correlation between events detected visually and events detected by electrical and/or environmental monitoring equipment to provide a user with a better understanding of the condition of electrical components within the panelboard.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A visual monitoring system for a load panel comprising:
   a first camera having a field of view and configured to be mounted on a surface of the load panel at a first camera position such that a first electrical component of the load panel is in the field of view of the first camera and to generate image based information corresponding to the first electrical component;
   a monitoring circuit coupled to the first electrical component and configured to monitor at least one parameter associated with the first electrical component and to generate parameter based information corresponding to the first electrical component; and
   a server in communication with the first camera and the monitoring circuit, the server configured to:
      receive the image based information corresponding to the first electrical component from the first camera and provide the image based information from the first camera to a user via a user interface, and
      receive the parameter based information corresponding to the first electrical component from the monitoring circuit and identify an event of interest in the first electrical component based on a correlation between the image based information corresponding to the first electrical component and the parameter information corresponding to the first electrical component, wherein in identifying the event of interest, the server is further configured to:
         model a relationship between the parameter based information and the image based information corresponding to the first electrical component; and
         identify the event of interest in response to the parameter based information received from the monitoring circuit deviating from the model by more than a predetermined threshold.

2. The visual monitoring system of claim 1, further comprising:
   a second camera having a field of view and configured to be mounted on a surface of the load panel at the first camera position such that the first electrical component of the load panel is in the field of view of the second camera and to generate image based information corresponding to the first electrical component in the field of view;
   wherein the server is further configured to receive the image based information corresponding to the first electrical component from the second camera and to provide the image based information from the second camera to the user via the user interface.

3. The visual monitoring system of claim 2,
   wherein the first camera is a wide-angle lens camera and the second camera is a focused-area camera; and
   wherein the server is further configured to combine the image based information from the wide-angle lens camera with the image based information from the focused-area camera to generate a composite image of the first electrical component including merged information from both the wide-angle lens camera and the focused-area camera and to provide the composite image to the user via the user interface.

4. The visual monitoring system of claim 2,
   wherein the first camera is a visual light based camera and the second camera is an infrared light based camera; and
   wherein the server is further configured to combine the image based information from the visual light based camera and the image based information from the infrared camera to generate a layered image of the first electrical component including both visual light based information from the visual light based camera and infrared light based information from the infrared based cameral and to provide the layered image to the user via the user interface.

5. The visual monitoring system of claim 1, wherein the first camera is further configured to generate at least one of still-image based information corresponding to the first electrical component and video image based information corresponding to the first electrical component.

6. The visual monitoring system of claim 1, further comprising:
a second camera having a field of view and configured to be mounted on a surface of the load panel at a second camera position such that a second electrical component of the load panel is in the field of view of the second camera and to generate image based information corresponding to the second electrical component;
wherein the server is further configured to receive the image based information corresponding to the second electrical component from the second camera and to provide the image based information from the second camera to the user via the user interface.

7. The visual monitoring system of claim 6, wherein the server is further configured to combine the image based information from the first camera with the image based information from the second camera to generate a composite image of the first electrical component and the second electrical component and to provide the composite image to the user via the user interface.

8. The visual monitoring system of claim 1, wherein the monitoring circuit is further configured to monitor an electrical parameter associated with the first electrical component.

9. The visual monitoring system of claim 1, wherein the server is further configured to transmit a notification to the user via the user interface in response to identifying the event of interest.

10. The visual monitoring system of claim 1, wherein the server is further configured to analyze the image based information over a period of time and to identify an event of interest in the first electrical component based on a determination that the image based information has changed over the period of time.

11. The visual monitoring system of claim 10, wherein the server is further configured to store at least a subset of the image based information in memory in response to identifying the event of interest.

12. The visual monitoring system of claim 1, wherein the monitoring circuit is further configured to monitor an environmental parameter associated with the first electrical component.

13. A method for monitoring a load panel comprising:
monitoring, with at least one first camera having a field of view and mounted on a surface of the load panel, a first electrical component of the load panel;
transmitting, by the at least one first camera, image based information associated with the first electrical component from the at least one first camera to a server;
providing, with the server, the image based information to a user via a user interface;
monitoring at least one parameter associated with the first electrical component;
analyzing the image based information and the at least one parameter; and
identifying an event of interest in the first electrical component based on a correlation between the image based information and the at least one parameter,
wherein identifying the event of interest includes:
modeling a relationship between the at least one parameter and the image based information associated with the first electrical component; and
identifying the event of interest in response to a determination that the image based information deviates from the model by at least a predetermined threshold.

14. The method of claim 13, further comprising:
monitoring, with at least one second camera having a field of view and mounted on a surface of the load panel, a second electrical component of the load panel;
transmitting, with the at least one second camera, image based information associated with the second electrical component from the at least one second camera to a server;
combining the image based information associated with the first electrical component with the image based information associated with the second electrical component to generate a composite image of the first and second electrical components; and
providing the composite image to the user via the user interface.

15. The method of claim 13, further comprising notifying the user via the user interface in response to identifying the event of interest.

16. The method of claim 13, wherein monitoring the at least one parameter includes monitoring an electrical parameter associated with the first electrical component.

17. The method of claim 13, wherein monitoring the at least one parameter includes monitoring an environmental parameter associated with the first electrical component.

18. A load panel comprising:
at least one load section;
at least one electrical component located within the at least one load section;
a door configured to cover the at least one electrical component within the at least one load section when closed; and
means for capturing image based information corresponding to the at least one electrical component while the at least one electrical component is energized and the door is closed, for monitoring at least one parameter of the at least one electrical component while the at least one electrical component is energized and the door is closed, for modeling a relationship between the image based information corresponding to the at least one electrical component and the at least one parameter of the at least one electrical component, and for identifying an event of interest in the at least one electrical component based on a determination that the at least one parameter has deviated from the model by more than a predetermined threshold.

* * * * *

UNITED STATES PATENT AND TRADEMARK OFFICE
CERTIFICATE OF CORRECTION

PATENT NO. : 10,210,393 B2  
APPLICATION NO. : 14/883736  
DATED : February 19, 2019  
INVENTOR(S) : John C. Van Gorp et al.

Page 1 of 1

It is certified that error appears in the above-identified patent and that said Letters Patent is hereby corrected as shown below:

In the Specification

In Column 1, Line number 64, delete "cameral" and add --camera--;

In the Claims

In Column 14, Claim number 4, Line number 63, delete "cameral" and add --camera--.

Signed and Sealed this  
Twenty-sixth Day of March, 2019

Andrei Iancu  
*Director of the United States Patent and Trademark Office*